United States Patent
Rech et al.

(10) Patent No.: US 11,408,789 B2
(45) Date of Patent: Aug. 9, 2022

(54) MEASURING ARRANGEMENT WITH A PRESSURE SENSOR MODULE

(71) Applicant: Endress + Hauser GmbH + Co. KG, Maulburg (DE)

(72) Inventors: Volkmar Rech, Puttlingen (DE); Sergej Lopatin, Lorrach (DE); Claudia Nowak, Freiburg (DE)

(73) Assignee: ENDRESS+HAUSER GMBH+CO.KG, Maulburg (DE)

( * ) Notice: Subject to any disclaimer, the term of this patent is extended or adjusted under 35 U.S.C. 154(b) by 0 days.

(21) Appl. No.: 15/735,646

(22) PCT Filed: May 24, 2016

(86) PCT No.: PCT/EP2016/061688
§ 371 (c)(1),
(2) Date: Dec. 12, 2017

(87) PCT Pub. No.: WO2016/206900
PCT Pub. Date: Dec. 29, 2016

(65) Prior Publication Data
US 2020/0033214 A1    Jan. 30, 2020

(30) Foreign Application Priority Data
Jun. 25, 2015    (DE) .......................... 10 2015 110 259

(51) Int. Cl.
*G01L 19/00*    (2006.01)
(52) U.S. Cl.
CPC ................................ *G01L 19/0023* (2013.01)
(58) Field of Classification Search
CPC .. G01L 19/0023; G01L 19/143; G01L 19/147
(Continued)

(56) References Cited

U.S. PATENT DOCUMENTS

| 4,295,117 A | 10/1981 | Lake et al. |
| 2004/0255645 A1 | 12/2004 | Imai |
| 2005/0028603 A1* | 2/2005 | Kato ..................... G01L 9/0054 73/754 |

FOREIGN PATENT DOCUMENTS

| CN | 12-84163 A | 2/2001 |
| CN | 1654938 A | 8/2005 |

(Continued)

OTHER PUBLICATIONS

German Search Report, German Patent Office, Munich, DE dated Mar. 16, 2003.

(Continued)

*Primary Examiner* — Tarun Sinha
(74) *Attorney, Agent, or Firm* — Bacon & Thomas, PLLC

(57) ABSTRACT

A pressure sensor module, comprising: a pressure measuring cell; and a mounting ring. The pressure measuring cell includes a platform and a measuring membrane, whose front face extends parallel to the rear face of the platform. The mounting ring has a mounting passageway with an inner mounting surface, which defines an inner axial stop plane for mounting the pressure measuring cell, wherein the mounting ring has an outer mounting surface, and the pressure measuring cell is inserted with the rear face preceding into the mounting passageway. The rear face of the platform is adhered with the inner mounting surface, wherein the inner mounting surface has a shoulder, which extends from an inner lateral surface of the mounting ring radially inwards. The mounting surface has between the axial stop surface and the inner lateral surface an annularly surrounding recess, in order to accommodate excess adhesive in the case of the adhering of the axial stop surface with the rear face of the platform.

12 Claims, 2 Drawing Sheets

(58) Field of Classification Search
USPC .......................................................... 73/756
See application file for complete search history.

(56) References Cited

FOREIGN PATENT DOCUMENTS

| | | |
|---|---|---|
| CN | 1864054 A | 11/2006 |
| CN | 10 1839776 A | 9/2010 |
| CN | 10-2939520 A | 2/2013 |
| CN | 10-3392117 A | 11/2013 |
| DE | 4234290 A1 | 4/1994 |
| DE | 10229703 A1 | 1/2004 |
| DE | 202004009330 U1 | 9/2004 |
| DE | 102011005705 A1 | 9/2012 |
| EP | 0 494 338 A1 | 7/1992 |
| EP | 2784463 A1 | 10/2014 |
| JP | 2005-280687 A | 3/2005 |
| JP | 2013-108954 A | 6/2013 |

OTHER PUBLICATIONS

International Search Report, EPO, The Netherlands, dated May 24, 2016.
English Translation of the International Preliminary Report on Patentability, WIPO, Geneva, CH, dated Jan. 18, 2004.
Office Action dated Jun. 3, 2019 in corresponding Chinese application No. 201680036447.1.

* cited by examiner

MEASURING ARRANGEMENT WITH A PRESSURE SENSOR MODULE

TECHNICAL FIELD

The invention relates to a measuring arrangement with a pressure sensor module. Measuring arrangements with pressure sensor modules comprise, usually, a pressure measuring cell, and a component for mounting the pressure measuring cell in the measuring arrangement.

BACKGROUND DISCUSSION

German Patent DE 10133066 B4 discloses, for example, a pressure measuring device, which has a pressure measuring cell, which is set in a casing. The casing has at a first end an radially inwardly extending shoulder, against which the pressure measuring cell is clamped, wherein the pressure measuring cell is contactable with a pressure through an opening bounded by the shoulder, wherein the pressure sensor module formed by the pressure measuring cell and the casing is installed in a housing.

Offenlegungsschrift (laid open German application), DE 102014207394 A1 describes a pressure sensor with a pressure measuring cell, which is held by means of a lid-shaped support element on a metal block serving as a process connection, wherein the pressure measuring cell is axially clamped between an elastic sealing ring and the support element, the sealing ring lies against the membrane-bearing face of the pressure measuring cell, the support element is embodied cap-like with a lid region and a bent around edge following thereon and capped over the pressure measuring cell, the inner contour of the support element about equals the outer contour of the pressure measuring cell and the support element is connected with the process connection by material bonding. The support element serves as abutment for the axial clamping of the pressure measuring cell.

Offenlegungsschrift (laid open German application), DE 10308820 A1 describes a ceramic pressure measuring cell. For providing chemical and thermal durability against a large number of chemicals, a polymer film is applied on the media-contacting measuring membrane of the pressure measuring cell.

Offenlegungsschrift (laid open German application), DE 04234290 A1 discloses a pressure sensor with a pressure measuring cell mounted with a defined separation on an abutment. For accommodating the pressure measuring cell, the pressure sensor includes a housing with a passageway, whose diameter sufficiently decreases in a front region of the housing that, toward the front, there remains between the housing and the therein flushly installed pressure measuring cell an annular gap, which is sealed with a radial seal.

Offenlegungsschrift (laid open European application), EP 0 1939600 A2 relates to a highly corrosion resistant pressure measuring transducer for achieving a low pressure loss, comprising a measuring transducer housing, which has a straight, tubular section, which in measurement operation is flowed through by a medium, whose pressure is to be measured. Formed on one end of the housing is an inlet conically narrowing toward the section. The medium flows into the section through the inlet. Formed on the other end of the housing is an outlet also conically narrowing toward the section. The medium flows out of the section via the outlet. The section has an opening, into which a ceramic pressure measuring cell with a pressure sensitive membrane is inserted with interposed measuring cell seal in such a manner that the measuring transducer housing externally comprises a front face of the pressure measuring cell, and the measuring cell seal effects a sealing between the pressure measuring cell and the measuring transducer housing. A measuring cell housing is mounted directly on the measuring transducer housing with an interposed housing seal. The measuring transducer housing has an opening, which externally surrounds a rear face of the pressure measuring cell. The pressure measuring cell is clamped in its axial direction between the measuring cell housing and the measuring transducer housing.

In the case of the mentioned documents from the state of the art, the front face of the pressure measuring cell is always clamped against a seal, which equalizes positioning tolerances.

SUMMARY OF THE INVENTION

There is, however, need for pressure sensor modules, which are, on the one hand, simple to assemble and to replace, and which, on the other hand, can be positioned reproducibly within minimum tolerances. It is an object of the present invention to provide such sensor modules and measuring arrangements containing such sensor modules.

The object is achieved according to the invention by the sensor module and by a measuring arrangement The pressure sensor module of the invention comprises: a pressure measuring cell; and a mounting ring, wherein the pressure measuring cell includes a platform, a measuring membrane and a transducer for transducing a pressure dependent deflection of the measuring membrane into at least one electrical or optical signal, wherein the measuring membrane is connected pressure-tightly with the platform along a peripheral edge, wherein a measuring chamber is formed between the platform and the measuring membrane, wherein the measuring membrane has a front face, which faces away from the platform and which is contactable with a pressure to be measured, wherein the platform has a rear face, which faces away from the measuring membrane and which has a peripheral edge region, wherein the mounting ring has a mounting passageway, wherein the mounting ring has an annularly surrounding, inner mounting surface in the mounting passageway, wherein the inner mounting surface defines an inner axial stop plane for mounting the pressure measuring cell, wherein the mounting ring has an outer mounting surface outside of the mounting passageway of the mounting ring, wherein the outer mounting surface defines an orientation of a mounting axis of the mounting ring relative to an abutment surface complementary to the outer mounting surface, wherein a normal vector of the inner axial stop plane extends parallel to the mounting axis, wherein the pressure measuring cell is inserted with the rear face of the platform preceding into the mounting passageway, wherein the edge region of the rear face of the platform is adhered to the inner mounting surface, wherein the inner mounting surface has a shoulder, which extends from an inner lateral surface of the mounting ring radially inwards, wherein the shoulder has between the axial stop surface and the inner lateral surface an annularly surrounding recess, in order to accommodate excess adhesive in the case of the adhering of the axial stop surface with the rear face of the platform.

By the shaping of the inner mounting surface, the pressure measuring cell can be positioned in a sufficiently exactly defined position relative to the mounting ring independently of tolerances as regards metering and distribution of the adhesive between the pressure measuring cell and the mounting ring.

In a further development of the invention, the adhesive layer between the axial stop surface and the rear face of the platform has a thickness of no more than 40 µm, especially no more than 20 µm and preferably in no more than 10 µm.

In a further development of the invention, a normal vector to a plane defined by the edge region of the rear face of the platform is tilted relative to the normal vector of the axial stop surface by no more than 2.4 mrad, especially no more than 1.2 mrad and preferably no more than 0.6 mrad.

In a further development of the invention, a plane defined by the peripheral edge region of the rear face of the platform extends, except for manufacturing tolerances, parallel to a plane defined by the front face of the measuring membrane. In an embodiment of this further development of the invention, the plane defined by the edge region of the rear face of the platform deviates from being parallel to the plane defined by the front face of the measuring membrane due to manufacturing tolerances by no more than 3 mrad, especially no more than 1.5 mrad and preferably no more than 1 mrad.

In a further development of the invention, the recess between the stop surface and the inner lateral surface in a longitudinal section through the mounting axis has an area of not less than 0.06 mm$^2$, especially not less than 0.1 mm$^2$ and preferably not less than 0.15 mm$^2$.

In a further development of the invention, the pressure measuring cell comprises a ceramic material, especially corundum.

In a further development of the invention, the mounting ring comprises a glass fiber reinforced plastic.

The measuring arrangement of the invention comprises: a pressure sensor module as claimed in one of the preceding claims; and a fluid module, wherein the fluid module includes at least one fluid duct and a sensor module seat, which communicates with the fluid duct, wherein the sensor module seat has an abutment surface complementary to the outer mounting surface of the mounting ring, wherein the outer mounting surface by contacting the abutment surface establishes an orientation of a mounting axis of the mounting ring relative to the abutment surface, wherein the measuring membrane is contactable with a pressure reigning in the fluid duct.

In a further development of the invention, the outer mounting surface is clamped against the abutment surface, wherein the abutment surface defines a plane, whose normal vector tilts from a normal vector to the front face of the measuring membrane by no more than 10 mrad, especially no more than 7 mrad and preferably no more than 4 mrad.

In a further development of the invention, the fluid duct has a wall region lying opposite the measuring membrane, wherein the average separation of the wall region from the measuring membrane or from a sealing mat covering the measuring membrane amounts to no more than a fifth, especially no more than a tenth, and preferably no more than a twentieth of the diameter of the measuring membrane.

In a further development of the invention, the sensor module seat has a first sealing surface, wherein the mounting ring has at its front end a second sealing surface, wherein the first sealing surface and the second sealing surface face one another, wherein at least one of the sealing surfaces faces the lateral surface of the pressure measuring cell, and wherein a sealing ring is clamped elastically between the sealing surfaces and the lateral surface of the pressure measuring cell.

BRIEF DESCRIPTION OF THE DRAWINGS

The invention will now be explained in greater detail based on the example of an embodiment illustrated in the drawing, the figures of which show as follows.

DETAILED DISCUSSION IN CONJUNCTION WITH THE DRAWINGS

Figure 1:
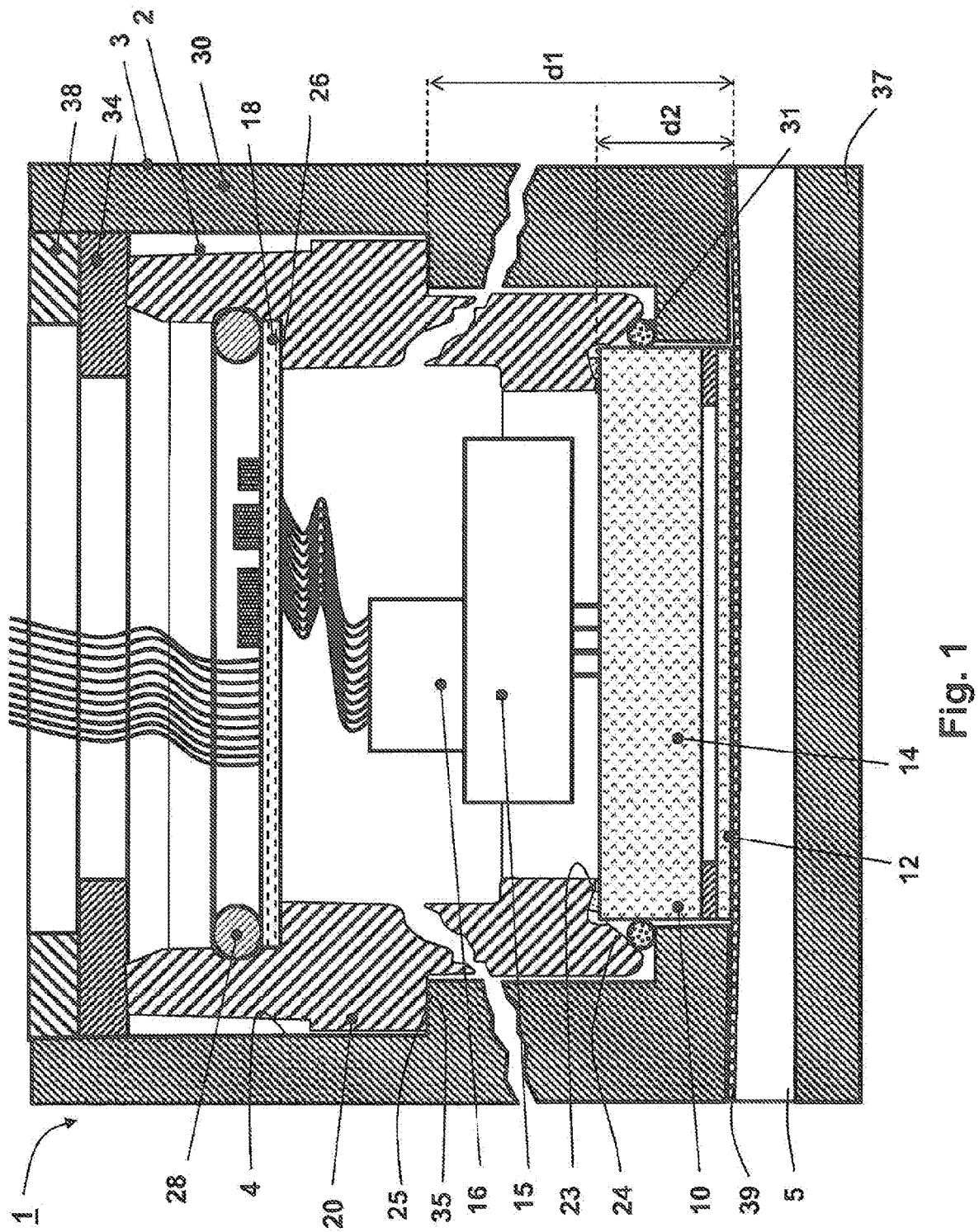
FIG. 1 is a longitudinal section through an example of an embodiment of a measuring arrangement of the invention.

The example of an embodiment of a measuring arrangement 1 of the invention shown in FIG. 1 includes a sensor module 2 and a fluid module 3, wherein the fluid module 3 has a sensor module seat 4, in which the sensor module 2 is arranged.

Sensor module 2 includes a ceramic pressure measuring cell 10 with a measuring membrane 12 and a platform 14, wherein the measuring membrane 12 is pressure-tightly connected with the platform along a peripheral joint to form a measuring chamber between the measuring membrane and the platform. The pressure measuring cell 10 further includes an electrical transducer, especially a capacitive or resistive transducer, for transducing a pressure dependent deflection of the measuring membrane into an electrical signal. The currently preferred capacitive transducer includes in the measuring chamber at least a first electrode on the face of the measuring membrane 12 facing the platform 14 and at least a second electrode on the face of the platform 14 facing the measuring membrane. The electrodes are not individually shown, since the transducer is not of interest in connection with the present invention. The capacitance between the electrodes is evaluated by a hybrid circuit 15, which is arranged encapsulated on a rear face of the platform away from the measuring membrane 12. Via a pluggable connector coupling 16 and a circuit board 18, which can have, for example, an impedance converter circuit, the hybrid circuit 15 is connectable by means of a cable to a superordinated unit. A cable section between the pluggable connector coupling 16 and the circuit board 18 mechanically decouples the circuit board 18 from the hybrid circuit, so that forces acting on the circuit board cannot be transferred to the pressure measuring cell 10.

Sensor module 2 further includes a mounting ring 20, which, on the one hand, carries the pressure measuring cell 10, and, on the other hand, enables a defined mounting of the sensor module 2 in the sensor module seat 4 of the fluid module 3. The mounting ring 20 comprises a synthetic material, or plastic, for example, a polyamide bearing the mark, Grivory®. Mounting ring includes, embodied as a traversing, stepped bore, a mounting passageway 21, which has various contour elements, which have meaning in connection with the mounting of the pressure measuring cell 10, as will now be explained with reference to FIGS. 1 and 2.

The mounting passageway 21 includes an annularly surrounding, inner mounting surface 23, which defines an inner axial stop plane for mounting the pressure measuring cell 10. The inner mounting surface 23 is formed by a shoulder 22, which extends radially inwards from an inner lateral surface of the mounting ring 20. The mounting surface 23 includes between the axial stop surface and the inner lateral surface of the mounting ring an annularly surrounding recess.

Pressure measuring cell 10 is inserted, with the platform 14 preceding, into the mounting passageway 21, wherein the platform 14 is adhered with the mounting surface 23 by means of an adhesive layer 50. Thus, the position of the measuring cell 10 is defined except for the thickness of the adhesive layer 50 between the axial stop surface and the rear face of the pressure measuring cell 10. The surrounding recess serves to accommodate extra adhesive displaced in the case of pressing the pressure measuring cell into position, so that, in the case of sufficient coating with adhesive in the mounting, the resulting, hardened adhesive layer has, as a result, a thickness of no more than 50 µm, especially no more than 25 µm.

Figure 2:
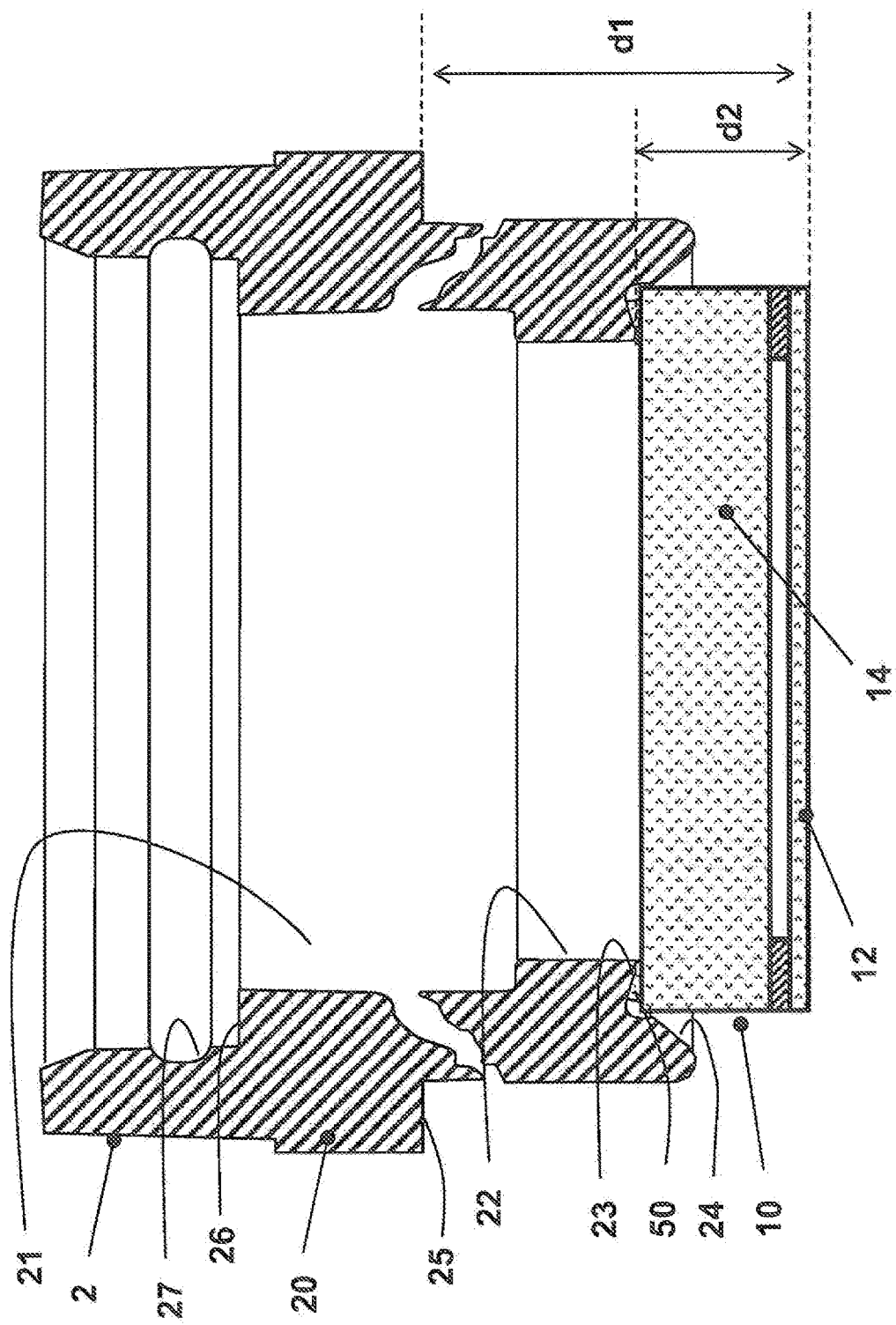
FIG. 2 is a simplified longitudinal section through an example of an embodiment of the sensor module of the invention for the measuring arrangement of FIG. 1.

This is noticeable, because a distance d1 illustrated in FIG. 2, which represents the axial separation between an outer axial stop surface 25 of the mounting ring 20 and the end face of the measuring membrane 12, is critical for the operation of the measuring arrangement, and the thickness of the adhesive layer 50 enters additively into this distance via a distance d2, which represents the axial separation between the axial stop surface of the mounting surface 23 and the end face of the measuring membrane 12. Aside from the distance d2, it is also important that a plane defined by the end face of the measuring membrane 12 extend as parallel as possible to a plane defined by the outer axial stop surface 25. This is facilitated when, in the mounting of the pressure measuring cell, excess adhesive can be squeezed into the recess of the mounting surface 23.

On the pressure measuring cell bearing, front end of the mounting ring 20, there is an inwardly inclined, first sealing surface 24, against which in the assembled state an elastic O-ring 31 lies, which is clamped between the sealing surface 24, the lateral surface of the platform of the pressure measuring cell 12, and a second sealing surface formed by a radial step in the sensor module seat 4.

The mounting passageway 21 further includes, facing away from the pressure measuring cell 12, a second axial stop surface 26, against which the circuit board 18 lies, from which a cable extends for connection to a superordinated unit. The circuit board 18 is secured, for example, with a retaining ring 28, which engages in an annular groove 27 in the mounting passageway 21. Other than in FIG. 1, in FIG. 2 the hybrid circuit and other electronic components are not shown, since, in such case, exclusively structural matters are being discussed.

Fluid module 3 comprises a module body 30 especially of a metal material. In the module body 30, the sensor module seat 4 is embodied in the form of a stepped bore. Sensor module seat 4 includes an abutment surface 35 formed by a radial step, against which the outer axial stop surface 25 of the mounting ring 20 lies in the assembled state. Therewith, in accordance with the object, the position of the measuring membrane 12 is fixed relative to the module body 30.

For securing the sensor module 2, the measuring arrangement 1 includes, for example, a clamping body 34, which, after insertion of the sensor module 2 into the sensor module seat 4, bears against a second end of the mounting ring 20 away from the pressure measuring cell 10. The clamping body 34, in turn, is secured in the sensor module seat with a screw ring 38.

Fluid module 3 can have a replaceable, media-contacting, elastomeric sealing mat 39, which is arranged on the bottom of the first module body 30 and seals the sensor module 2 from a fluid duct 5, which extends on the bottom of the module body and which is bounded relative to the sensor module by a wall region in the form of a baseplate 37.

In the case of small fluid duct cross-sections, their particular value in the region of the measuring membrane 12 depends significantly on their axial position and angle of inclination. Therefore, the sensor module of the invention with its exact positioning of the pressure measuring cell contributes to a relevant increasing of the accuracy of measurement of the measuring arrangement.

The invention claimed is:

1. A measuring arrangement, comprising:
a pressure sensor module, and a fluid module;
wherein said pressure sensor module comprises:
a pressure measuring cell; and
a mounting ring,
wherein said pressure measuring cell includes a platform, a measuring membrane and a transducer for transducing a pressure dependent deflection of said measuring membrane into at least one electrical or optical signal;
wherein said measuring membrane is connected pressure-tightly with said platform along a peripheral edge;
wherein a measuring chamber is formed between said platform and said measuring membrane;
wherein said measuring membrane has a front face, which faces away from said platform and which is contactable with a pressure to be measured;
wherein said platform has a rear face, which faces away from said measuring membrane and which has a peripheral edge region;
wherein said mounting ring has a mounting passageway;
wherein said mounting ring has an annularly surrounding, inner mounting surface in said mounting passageway;
wherein said inner mounting surface defines an inner axial stop plane for mounting said pressure measuring cell;
wherein said mounting ring has an outer mounting surface outside of said mounting passageway of said mounting ring;
wherein said outer mounting surface defines an orientation of a mounting axis of said mounting ring relative to an abutment surface complementary to said outer mounting surface;
wherein a normal vector of the inner axial stop plane extends parallel to the mounting axis;
wherein said pressure measuring cell is inserted with the rear face preceding into said mounting passageway;
wherein the edge region of the rear face of said platform is adhered to said inner mounting surface;
wherein said inner mounting surface has a shoulder, which extends from an inner lateral surface of said mounting ring radially inwards;
wherein said inner mounting surface has between the axial stop surface and the inner lateral surface an annularly surrounding recess, in order to accommodate excess adhesive in the case of the adhering of the axial stop surface with the rear face of said platform;
wherein said fluid module includes at least one fluid duct and a sensor module seat, which communicates with said fluid duct;
wherein said sensor module seat has an abutment surface complementary to said outer mounting surface of said mounting ring;
wherein said outer mounting surface by contacting said abutment surface establishes an orientation of a mounting axis of said mounting ring relative to said abutment surface; and
wherein said measuring membrane is contactable with a pressure reigning in said fluid duct.

2. The measuring arrangement as claimed in claim 1, wherein:
the adhesive layer between the axial stop surface and the rear face of said platform has a thickness of no more than 40 µm, especially no more than 20 µm and preferably no more than 10 µm.

3. The measuring arrangement as claimed in claim 1, wherein:
 a normal vector to a plane defined by the edge region of the rear face of said platform is tilted relative to the normal vector of the axial stop surface by no more than 2.4 mrad, especially no more than 1.2 mrad and preferably no more than 0.6 mrad.

4. The measuring arrangement as claimed in claim 1, wherein:
 the recess between the stop surface and the inner lateral surface in a longitudinal section through the mounting axis has an area of not less than 0.08 mm2, especially not less than 0.1 mm2 and preferably not less than 0.15 mm2.

5. The measuring arrangement as claimed in claim 1, wherein:
 said pressure measuring cell comprises a ceramic material, especially corundum.

6. The measuring arrangement as claimed in claim 1, wherein:
 said mounting ring comprises a glass fiber reinforced plastic.

7. The measuring arrangement as claimed in claim 1, wherein:
 a plane defined by the peripheral edge region of the rear face of said platform extends, except for manufacturing tolerances, parallel to a plane defined by the front face of said measuring membrane.

8. The measuring arrangement as claimed in claim 7, wherein:
 the plane defined by the edge region of the rear face of said platform deviates from being parallel to the plane defined by the front face of said measuring membrane due to manufacturing tolerances by no more than 3 mrad, especially no more than 1.5 mrad and preferably no more than 1 mrad.

9. The measuring arrangement as claimed in claim 1, wherein:
 a plane defined by the peripheral edge region of the rear face of said platform extends, except for manufacturing tolerances, parallel to the front face of said measuring membrane.

10. The measuring arrangement as claimed in claim 1, wherein:
 said outer mounting surface is clamped against said abutment surface;
 said abutment surface defines a plane, whose normal vector tilts from a normal vector to the front face of said measuring membrane by no more than 10 mrad, especially no more than 7 mrad and preferably no more than 4 mrad.

11. The measuring arrangement as claimed in claim 1, wherein:
 the fluid duct has a wall region lying opposite said measuring membrane, the average separation of the wall region from said measuring membrane or from a sealing mat covering said measuring membrane amounts to no more than a fifth, especially no more than a tenth, and preferably no more than a twentieth of the diameter of said measuring membrane.

12. The measuring arrangement as claimed in claim 1, wherein:
 the sensor module seat has a first sealing surface;
 said mounting ring has at its front end a second sealing surface;
 said first sealing surface and said second sealing surface face one another;
 at least one of the sealing surfaces faces the lateral surface of said pressure measuring cell; and
 a sealing ring is clamped elastically between the sealing surfaces and the lateral surface of said pressure measuring cell.

* * * * *